(12) United States Patent
Mizutani et al.

(10) Patent No.: US 8,802,017 B2
(45) Date of Patent: Aug. 12, 2014

(54) HONEYCOMB FILTER

(75) Inventors: Takashi Mizutani, Tokoname (JP); Shingo Iwasaki, Gifu (JP)

(73) Assignee: NGK Insulators, Ltd., Nagoya (JP)

( * ) Notice: Subject to any disclaimer, the term of this patent is extended or adjusted under 35 U.S.C. 154(b) by 330 days.

(21) Appl. No.: 13/417,770

(22) Filed: Mar. 12, 2012

(65) Prior Publication Data

US 2012/0244042 A1    Sep. 27, 2012

(30) Foreign Application Priority Data

Mar. 23, 2011    (JP) .................................. 2011-064165

(51) Int. Cl.
*B01D 50/00*    (2006.01)

(52) U.S. Cl.
USPC .......................................... 422/180; 422/177

(58) Field of Classification Search
USPC ...................... 422/177, 180; 428/116; 55/523
See application file for complete search history.

(56) References Cited

U.S. PATENT DOCUMENTS

| | | | |
|---|---|---|---|
| 7,524,350 B2 | 4/2009 | Kunieda | |
| 2005/0255021 A1* | 11/2005 | DiFrancesco et al. | 423/239.1 |
| 2007/0234694 A1* | 10/2007 | Miyairi et al. | 55/523 |
| 2008/0004174 A1 | 1/2008 | Itoh et al. | |
| 2008/0070776 A1* | 3/2008 | Yamaguchi | 502/100 |
| 2010/0135866 A1 | 6/2010 | Mizuno et al. | |

FOREIGN PATENT DOCUMENTS

| | | |
|---|---|---|
| EP | 0 834 343 A1 | 4/1998 |
| EP | 1 808 217 A1 | 7/2007 |
| EP | 2 108 494 A2 | 10/2009 |
| EP | 2 158 956 A1 | 3/2010 |
| WO | 2006/041174 A1 | 4/2006 |
| WO | 2008/136232 A1 | 11/2008 |

OTHER PUBLICATIONS

Extended European Search Report dated Jul. 20, 2012.

* cited by examiner

*Primary Examiner* — Tom Duong
(74) *Attorney, Agent, or Firm* — Burr & Brown, PLLC

(57) ABSTRACT

In a honeycomb filter 20, partition portions and trapping layers are formed such that a pore volume difference that is obtained from pore distributions measured by mercury porosimetry and is a difference in volume of pores having a diameter of 10 μm or less between the downstream portion and the upstream portion of the honeycomb filter, is in the range of 0.01 $cm^3/g$ or more and 0.08 $cm^3/g$ or less. In the honeycomb filter, in the downstream portion, a first pore volume peak is present in a first pore diameter range of 2 μm or more and 9 μm or less and a second pore volume peak that is higher than the first pore volume peak is present in a second pore diameter range of 10 μm or more and 25 μm or less.

8 Claims, 6 Drawing Sheets

HONEYCOMB FILTER

BACKGROUND OF THE INVENTION

1. Field of the Invention

The present invention relates to a honeycomb filter.

2. Description of the Related Art

A honeycomb filter has been proposed that has a porous structure in which, when cell partitions have a first pore group of pores having a diameter in the range of 1.0 to 150 μm and a second pore group of pores having a diameter in the range of 0.006 μm or more and less than 1.0 μm in a pore distribution curve, a single peak of the pore diameter distribution is present in the first pore group and a plurality of peaks of the pore diameter distribution are present in the second pore group (for example, refer to Patent Literature 1). It is stated that this filter can achieve trapping and removing of particulate matter (PM) contained in exhaust gas and cleaning of hazardous gas. Another honeycomb filter has been proposed that has partitions having porous partition bases and surface layers provided on the inflow sides of the partition bases, wherein conditions including the peak pore diameter of the surface layers, the porosity of the surface layers, the thickness of the surface layers, the mass of the surface layers with respect to filtration area, and the average pore diameter of the partition bases are properly adjusted (for example, refer to Patent Literature 2). In this filter, a rapid increase in the pressure loss immediately after the initiation of trapping of particulate matter (PM) is not caused and the relationship between the amount of PM deposited and the pressure loss does not have hysteresis characteristics. Thus, the pressure loss in an initial state where PM is not deposited can be suppressed to a low value.

Patent Literature 1: WO2006/041174
Patent Literature 2: WO2008/136232

SUMMARY OF THE INVENTION

The honeycomb filter described in Patent Literature 1 has a specified porous structure; however, this is not satisfactory and further enhancement of the trapping performance has been demanded. In the honeycomb filter described in Patent Literature 2, an increase in the pressure loss can be suppressed; however, an additional improvement of, for example, further suppressing an increase in the pressure loss particularly in the case of entry of soot in pores at a high flow rate has been demanded.

The present invention has been accomplished under these circumstances. A main object of the present invention is to provide a honeycomb filter having an enhanced performance of trapping solid components contained in fluid.

Accordingly, a honeycomb filter according to the present invention includes: a plurality of porous partition portions forming a plurality of cells serving as channels of fluid; and trapping layers that are formed on the partition portions and configured to trap a solid component contained in the fluid, wherein a volume of pores having a diameter of 10 μm or less in a downstream portion of the cells measured by mercury porosimetry is larger than a volume of pores having a diameter of 10 μm or less in an upstream portion of the cells measured by mercury porosimetry by 0.01 $cm^3/g$ or more and 0.08 $cm^3/g$ or less.

This honeycomb filter has an enhanced performance of trapping solid components contained in fluid. This is probably achieved by the following reasons. For example, when the volume of pores having a diameter of 10 μm or less in the downstream portion is larger than the volume of pores having a diameter of 10 μm or less in the upstream portion by 0.01 $cm^3/g$ or more, the amount of a catalyst loaded in the downstream portion of the trapping layers is sufficiently large and hence a decrease in PM combustion percentage after endurance of combustion removal of deposited solid components (PM) by forced regeneration can be further suppressed. When the volume of pores having a diameter of 10 μm or less in the downstream portion is larger than the volume of pores having a diameter of 10 μm or less in the upstream portion by 0.08 $cm^3/g$ or less, a catalyst is not excessively deposited in pores in the trapping layers in the downstream portion and hence clogging of the pores of the trapping layers can be further suppressed and the pressure loss upon deposition of PM can be further reduced. Thus, the trapping performance can be further enhanced. Herein, the "upstream portion" denotes a portion that is away from the upstream end surface of the honeycomb filter by 20% of the entire length of the honeycomb filter in the channel direction; the "midstream portion" denotes a portion that is away from the upstream end surface of the honeycomb filter by 50% of the entire length of the honeycomb filter in the channel direction; and the "downstream portion" denotes a portion that is away from the downstream end surface of the honeycomb filter by 20% of the entire length of the honeycomb filter in the channel direction.

A honeycomb filter according to the present invention may satisfy the following conditions: in a Log differential pore volume distribution of the downstream portion measured by mercury porosimetry, a first pore volume peak is present in a first pore diameter range and a second pore volume peak that is higher than the first pore volume peak is present in a second pore diameter range that includes a second pore diameter that is larger than a pore diameter of the first pore volume peak, and in a Log differential pore volume distribution of the upstream portion measured by mercury porosimetry, the second pore volume peak in the second pore diameter range only is present. In general, for example, when deposited PM is subjected to combustion removal by forced regeneration, an increase in the temperature due to heat generated by the combustion propagates from the upstream region to the downstream region and the downstream end has the highest temperature. Due to this high temperature in the downstream end, the catalyst coating in the downstream portion may be thermally degraded and the PM combustion efficiency in the downstream portion may be degraded. Herein, by forming the trapping layers having a pore characteristic of a two-peak distribution in the downstream portion of the honeycomb filter, the trapping layers can be coated with a catalyst in a larger amount in the downstream portion than that in the upstream portion and the PM combustion performance can be maintained even after combustion endurance.

A honeycomb filter according to the present invention may satisfy the following conditions: the first pore diameter range is a range of 2 μm or more and 9 μm or less, and the second pore diameter range is a range of 10 μm or more and 25 μm or less. When the first pore diameter range is 2 μm or more, an increase in the pressure loss due to low permeability can be avoided. When the first pore diameter range is 9 μm or less, an increase in the pressure loss due to deposition of PM in the pores of the partition portions (bases) caused by insufficient trapping of PM can be avoided. When the second pore diameter range is 10 μm or more, a rapid increase in the pressure loss due to clogging of pores in the partition portions by a catalyst can be avoided. When the second pore diameter range is 25 μm or less, PM that is not trapped with the trapping layers can be trapped with the partition portions and hence the trapping performance is enhanced.

In a honeycomb filter according to the present invention, a porosity of the upstream portion and a porosity of the downstream portion that are measured by mercury porosimetry may be in a range of 35% or more and 70% or less. When the porosity of the upstream and downstream portions is 35% or more, an increase in the pressure loss due to a decrease in the permeability of the pores of the partition portions after coating with a catalyst can be avoided. When the porosity of the upstream and downstream portions is 70% or less, the partition portions, the trapping layers, and the like have suitable pore volumes and a catalyst can be sufficiently loaded in the trapping layers. As a result, the problem that the PM combustion performance is degraded after combustion endurance can be avoided.

In a honeycomb filter according to the present invention, the trapping layers may be formed by supplying an inorganic material serving as a raw material of the trapping layers to the cells with a gas serving as a transport medium. In this case, by using transportation with the gas, the formation state of the trapping layers such as the thickness of the trapping layers can be relatively easily controlled.

In a honeycomb filter according to the present invention, the partition portions may be formed so as to contain one or more inorganic materials selected from cordierite, SiC, mullite, aluminum titanate, alumina, silicon nitride, SIALON, zirconium phosphate, zirconia, titania, and silica. The trapping layers may be formed so as to contain one or more inorganic materials selected from cordierite, SiC, mullite, aluminum titanate, alumina, silicon nitride, SIALON, zirconium phosphate, zirconia, titania, and silica. In this case, the trapping layers are preferably formed of a material of the same type as that of a material of the partition portions.

In a honeycomb filter according to the present invention, the honeycomb filter may include two or more honeycomb segments bonded together with a bonding layer, the honeycomb segments including the partition portions and the trapping layers. In this case, by the bonding with the bonding layer, the mechanical strength of the honeycomb filter can be enhanced. Alternatively, a honeycomb filter according to the present invention may be an integrally formed product. In this case, the configuration is simplified and the honeycomb filter can be readily produced.

A honeycomb filter according to the present invention may be loaded with a catalyst. In this case, for example, removal of trapped solid components by combustion can be more efficiently performed.

DESCRIPTION OF PREFERRED EMBODIMENTS

Figure 1:
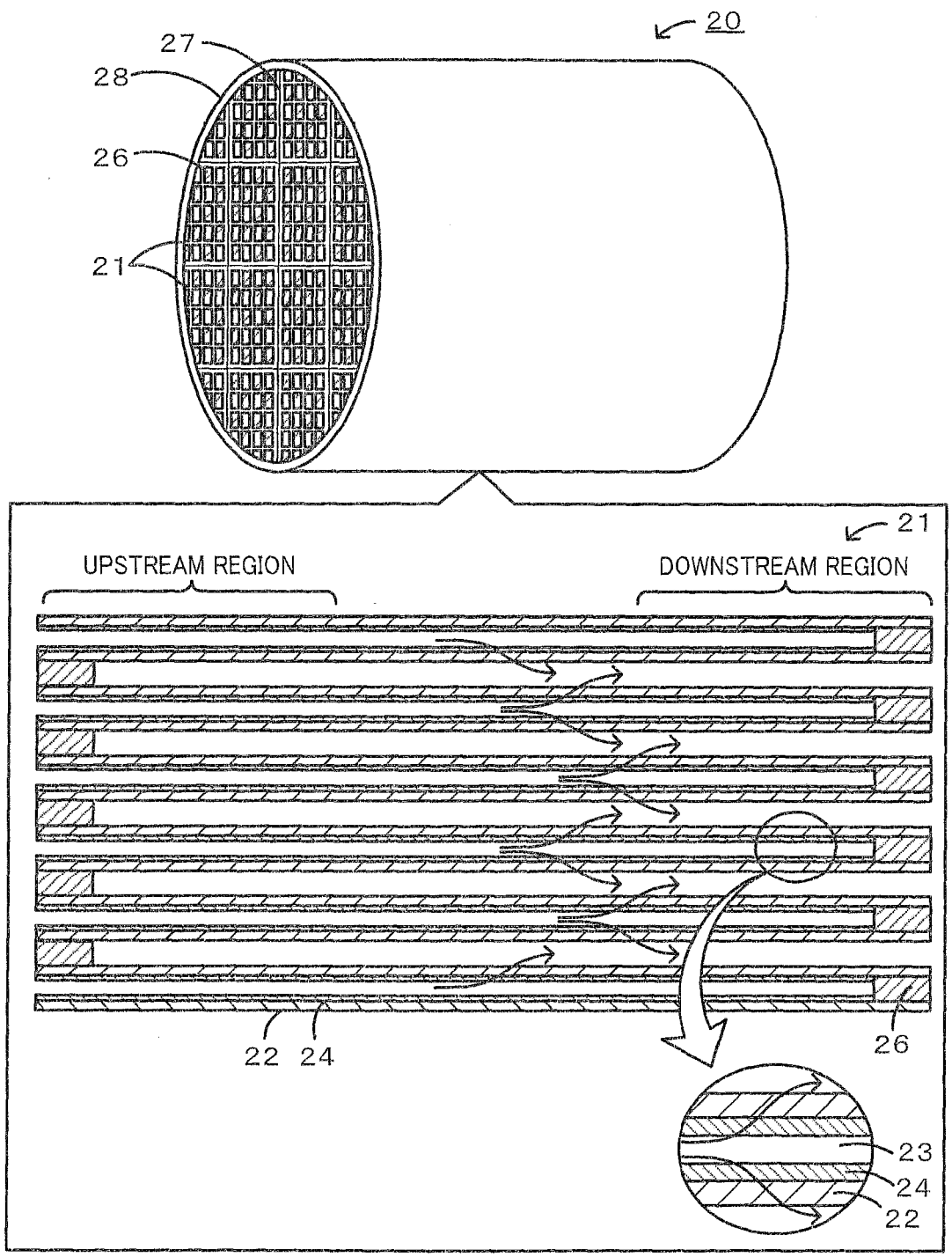
FIG. 1 is an explanatory view illustrating a schematic example of the configuration of a honeycomb filter 20.
Figure 2:
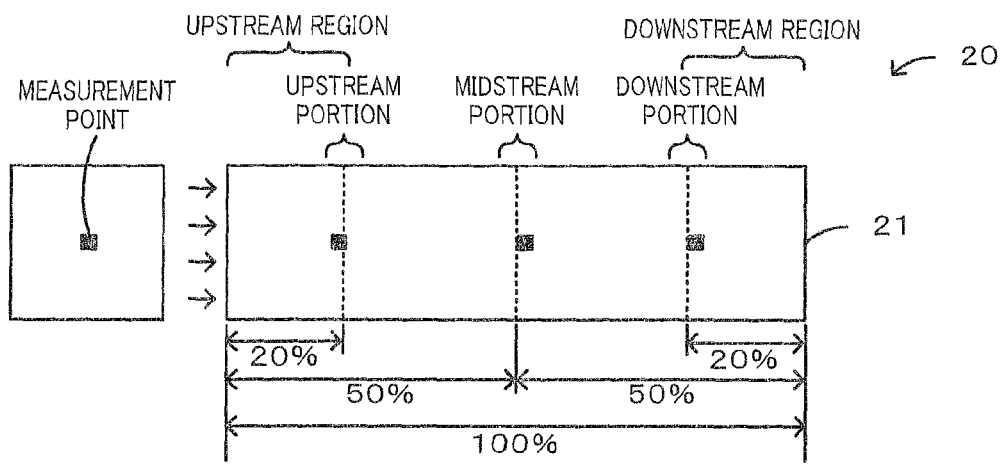
FIG. 2 is an explanatory view illustrating measurement points of the pore distributions of trapping layers 24.
Figure 3:
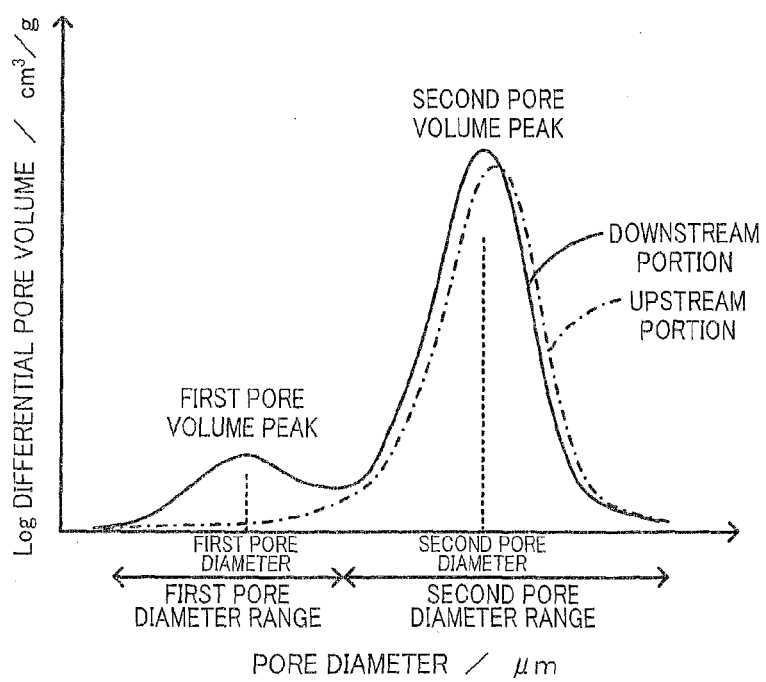
FIG. 3 is an explanatory view of Log differential pore volume distributions.

A honeycomb filter according to an embodiment of the present invention will be described with reference to drawings. FIG. 1 is an explanatory view illustrating a schematic example of the configuration of a honeycomb filter 20 according to an embodiment of the present invention. FIG. 2 is an explanatory view illustrating measurement points of the pore distributions of trapping layers 24. FIG. 3 is an explanatory view illustrating Log differential pore volume distributions. As illustrated in FIG. 1, in the honeycomb filter 20 according to the embodiment, a structure in which two or more honeycomb segments 21 having partition portions 22 are bonded together with bonding layers 27 is formed, and a circumferential protective portion 28 is formed around the structure. FIG. 1 illustrates an example in which the honeycomb filter 20 has a cylindrical outer shape, the honeycomb segments 21 have a rectangular prism outer shape, and cells 23 have a rectangular shape. The honeycomb filter 20 includes the porous partition portions 22 forming the plurality of cells 23 that each have one end open and the other end sealed with a sealing portion 26 and that function as channels of exhaust gas as fluid; and the trapping layers 24 formed on the partition portions 22 and configured to trap solid components (PM) contained in the fluid (exhaust gas). In the honeycomb filter 20, the partition portions 22 are formed such that a cell 23 that has one end open and the other end sealed and a cell 23 that has one end sealed and the other end open are alternately arranged. In the honeycomb filter 20, exhaust gas having entered the cells 23 on the entry side passes through the trapping layers 24 and the partition portions 22 and is discharged from the cells 23 on the exit side; during this process, PM contained in the exhaust gas is trapped onto the trapping layers 24.

The partition portions 22 are formed so as to have a thickness, that is, a partition thickness of 150 μm or more and 460 μm or less, more preferably 200 μm or more and 400 μm or less, still more preferably 280 μm or more and 350 μm or less. The partition portions 22 are porous and, for example, may be formed so as to contain one or more inorganic materials selected from cordierite, Si-bonded SiC, recrystallized SiC, aluminum titanate, mullite, silicon nitride, SIALON, zirconium phosphate, zirconia, titanic, alumina, and silica. Of these, for example, cordierite, Si-bonded SiC, and recrystallized SiC are preferred. The partition portions 22 preferably have a porosity of 30 vol % or more and 85 vol % or less, more preferably 35 vol % or more and 65 vol % or less. The partition portions 22 preferably have an average pore diameter in the range of 10 μm or more and 60 μm or less. The porosity and the average pore diameter of the partition portions 22 denote measurement results obtained by mercury porosimetry. When the partition portions 22 are formed so as to have such a porosity, an average pore diameter, and a thickness, exhaust gas readily passes the partition portions 22 and PM is readily trapped and removed.

The trapping layers 24, which are configured to trap and remove PM contained in exhaust gas, may be formed of, on the partition portions 22, a particle group having an average particle size smaller than the average pore diameter of the partition portions 22. The raw-material particles forming the trapping layers 24 preferably have an average particle size of 0.5 μm or more and 15 μm or less. When the average particle size is 0.5 μm or more, the space between the particles forming the trapping layers can have a sufficiently large size and hence the permeability of the trapping layers can be maintained and a rapid increase in the pressure loss can be suppressed. When the average particle size is 15 μm or less, the particles have a sufficiently large number of contact points between the particles and hence a sufficiently high bonding strength between the particles can be achieved and the trapping layers can have a sufficiently high peel strength. The trapping layers 24 may be formed on the partition portions 22 of the exhaust-gas-entry-side cells and the exhaust-gas-exit-side cells. However, as illustrated in FIG. 1, the trapping layers 24 are preferably formed on the partition portions 22 of the entry-side cells and not in the exit-side cells. In this case, the pressure loss can be further decreased and PM contained in fluid can be more efficiently removed. In addition, the production of the honeycomb filter 20 is facilitated. The trapping layers 24 may be formed so as to contain one or more inorganic materials selected from cordierite, SiC, mullite, aluminum titanate, alumina, silicon nitride, SIALON, zirconium phosphate, zirconia, titania, and silica. In this case, the trapping layers 24 are preferably formed of a material of the same type as that of a material of the partition portions 22. The average particle size of the raw-material particles denotes the median diameter (D50) of the raw-material particles measured with a laser diffraction/scattering particle size distribution analyzer and with water serving as a dispersion medium. The trapping layers 24 formed of a particle group of an inorganic material may be formed as uniform layers over the surfaces of the partition portions 22 or as partial layers on the surfaces of the partition portions 22.

In the honeycomb filter 20, the volume of pores having a diameter of 10 μm or less in the downstream portion of the cells measured by mercury porosimetry is larger than the volume of pores having a diameter of 10 μm or less in the upstream portion of the cells measured by mercury porosimetry by 0.01 cm$^3$/g or more and 0.08 cm$^3$/g or less. When the volume of pores having a diameter of 10 μm or less in the downstream portion is larger than the volume of pores having a diameter of 10 μm or less in the upstream portion by 0.01 cm$^3$/g or more, the amount of a catalyst loaded in the downstream portion of the trapping layers is sufficiently large and hence a decrease in PM combustion percentage after endurance of combustion removal of deposited solid components (PM) by forced regeneration can be further suppressed. When the volume of pores having a diameter of 10 μm or less in the downstream portion is larger than the volume of pores having a diameter of 10 μm or less in the upstream portion by 0.08 cm$^3$/g or less, a catalyst is not excessively deposited in pores in the trapping layers in the downstream portion and hence clogging of the pores of the trapping layers can be further suppressed and the pressure loss upon deposition of PM can be further reduced. Thus, the trapping performance can be further enhanced.

Herein, regions of the honeycomb filter 20 will be described. As illustrated in FIG. 2, the "upstream portion" denotes a portion that is away from the upstream end surface of the honeycomb filter 20 by 20% of the entire length of the honeycomb filter 20 in the channel direction; the "midstream portion" denotes a portion that is away from the upstream end surface of the honeycomb filter 20 by 50% of the entire length of the honeycomb filter 20 in the channel direction; and the "downstream portion" denotes a portion that is away from the downstream end surface of the honeycomb filter 20 by 20% of the entire length of the honeycomb filter 20 in the channel direction. A region that is upstream from the upstream portion is referred to as an "upstream region". A region that is downstream from the downstream portion is referred to as a "downstream region". As for the upstream portion, the honeycomb filter 20 is cut to provide a cross section, at the portion that is away from the upstream end surface of the honeycomb filter 20 by 20% of the entire length of the honeycomb filter 20 in the channel direction. As for the downstream portion, the honeycomb filter 20 is cut to provide a cross section, at the portion that is away from the downstream end surface of the honeycomb filter 20 by 20% of the entire length of the honeycomb filter 20 in the channel direction. As for the midstream portion, the honeycomb filter 20 is cut to provide a cross section, at the portion that is away from the upstream end surface of the honeycomb filter 20 by 50% of the entire length of the honeycomb filter 20 in the channel direction. In each of the cross sections, an observation specimen having sides of about 1 cm is cut from the central portion of the cross section and used as a measurement specimen. Herein, for example, when the honeycomb filter includes the honeycomb segments 21 bonded together, the measurement specimens are prepared from the central honeycomb segment; when the honeycomb filter is an integrally formed product (refer to FIG. 4 described below), the measurement specimens are prepared from the central portions of the cross sections of the integrally formed product.

The honeycomb filter 20 is measured by mercury porosimetry under conditions according to "Test methods for pore size distribution of fine ceramic green body by mercury porosimetry" in JIS-R1655.

As illustrated in FIG. 3, the honeycomb filter 20 may have a Log differential pore volume distribution of the downstream portion measured by mercury porosimetry in which a first pore volume peak is present in a first pore diameter range and a second pore volume peak that is higher than the first pore volume peak is present in a second pore diameter range that includes a second pore diameter that is larger than the pore diameter of the first pore volume peak; the honeycomb filter 20 may have a Log differential pore volume distribution of the upstream portion measured by mercury porosimetry in which the second pore volume peak in the second pore diameter range only is present. In general, for example, when deposited PM is subjected to combustion removal by forced regeneration, an increase in the temperature due to heat generated by the combustion propagates from the upstream region to the downstream region and the downstream end has the highest temperature. Due to this high temperature in the downstream end, the catalyst coating in the downstream portion may be thermally degraded and the PM combustion efficiency in the downstream portion may be degraded. Herein, by forming the trapping layers having a pore characteristic of a two-peak distribution in the downstream portion of the honeycomb filter 20, the trapping layers can be coated with a catalyst in a larger amount in the downstream portion than that in the upstream portion of the honeycomb filter 20 and the PM combustion performance can be maintained even after combustion endurance.

In this case, in the honeycomb filter 20, the first pore diameter range may be the range of 2 μm or more and 9 μm or less and the second pore diameter range may be the range of 10 μm or more and 25 μm or less. When the first pore diameter range is 2 μm or more, an increase in the pressure loss due to low permeability can be avoided. When the first pore diameter range is 9 μm or less, an increase in the pressure loss due to deposition of PM in the pores of the partition portions (bases) caused by insufficient trapping of PM can be avoided. When the second pore diameter range is 10 μm or more, a rapid increase in the pressure loss due to clogging of pores in the partition portions by a catalyst can be avoided. When the second pore diameter range is 25 μm or less, PM that is not trapped with the trapping layers can be trapped with the partition portions and hence the trapping performance is enhanced.

In the honeycomb filter 20, the porosity of the upstream portion and the porosity of the downstream portion that are measured by mercury porosimetry may be in the range of 35% or more and 70% or less. When the porosity of the upstream and downstream portions is 35% or more, an increase in the pressure loss due to a decrease in the permeability of the pores of the partition portions after coating with a catalyst can be avoided. When the porosity of the upstream and downstream portions is 70% or less, the partition portions, the trapping layers, and the like have suitable pore volumes and a catalyst can be sufficiently loaded in the trapping layers. As a result, the problem that the PM combustion performance is degraded after combustion endurance can be avoided.

The trapping layers 24 may be formed by using fluid as a transport medium of the raw material of the trapping layers and supplying a gas containing the raw material of the trapping layers to entry cells. In this case, the particle group forming the trapping layers can be formed as a coarse particle group and hence trapping layers having a high porosity can be formed, which is preferable. The fluid serving as the transport medium is preferably a gas such as the air or nitrogen gas. The raw material of the trapping layers may be, for example, inorganic fibers or inorganic particles. The inorganic fibers may be composed of the above-described inorganic materials and, for example, preferably have an average particle size of 0.5 μm or more and 8 μm or less and have an average length of 100 μm or more and 500 μm or less. The inorganic particles may be composed of the above-described inorganic materials. For example, SiC particles or cordierite particles having an average particle size of 0.5 μm or more and 15 μm or less may be used. The raw material of the trapping layers preferably has an average particle size smaller than the average pore diameter of the partition portions 22. Herein, the inorganic materials of the partition portions 22 and the trapping layers 24 are preferably of the same type. When a gas containing inorganic particles is made to flow into the entry, the gas is preferably suctioned from the exit of the gas. In the formation of the trapping layers 24, a binder may be supplied together with inorganic fibers or inorganic particles. The binder may be selected from sol materials and colloid materials and is preferably, in particular, colloidal silica. It is preferred that the inorganic particles be covered with silica and bonded together with silica and that the inorganic particles and the material of the partition portions be bonded together with silica. For example, when an oxide material such as cordierite or aluminum titanate is used, it is preferred that the inorganic particles be bonded together by sintering and that the inorganic particles and the material of the partition portions be bonded together by sintering. The trapping layers 24 are preferably formed by forming layers of a raw material on the partition portions 22 and subsequently performing a heat treatment to achieve the bonding. The temperature of the heat treatment is preferably, for example, 650° C. or more and 1350° C. or less. When the heat treatment temperature is 650° C. or more, a sufficiently high bonding strength can be achieved. When the heat treatment temperature is 1350° C. or less, clogging of pores due to excessive oxidation of particles can be suppressed. Alternatively, for example, the trapping layers 24 may be formed on the surfaces of the cells 23 with a slurry containing inorganic particles serving as a raw material of the trapping layers 24.

In the trapping layers 24 formed with fluid (air) serving as a transport medium of the raw material of the trapping layers, the pore volumes of the upstream and downstream portions of the cells measured by mercury porosimetry, the pore volume peak characteristics, and the like can be controlled by properly setting conditions including the average particle size and particle size distribution of the raw material of the trapping layers, the feed rate (film-formation rate) of the raw material of the trapping layers, the flow rate of the fluid, and the particle size distribution and amount of a pore-forming agent. By making predetermined regions of the partition portions 22 such as the upstream and downstream regions of the honeycomb segments 21 contain alcohol, water, a resin, or the like to increase the permeation resistance to the fluid, regions where the raw-material particles of the trapping layers and a pore-forming agent that are fed are deposited can be controlled. For example, by making the amount of a pore-forming agent added to the raw-material particles of the trapping layers be 3 mass % to 45 mass %, by making the median particle diameter D50 of the pore-forming agent be 0.7 μm to 8.0 μm, by making the sharpness index Ds of the particle size distribution of the pore-forming agent be 0.4 to 1.9, or by making the flow rate of the fluid be 780 L/min to 820 L/min, values including a pore volume and a peak pore diameter can be varied in the upstream and downstream portions. Specifically, for example, after portions other than the downstream region are coated with resin so that fluid does not permeate the resin, a film of fine particles is formed only in the downstream region including the downstream portion. The coated resin is then removed by burning. Subsequently, to form a film in a certain region located upstream with respect to the downstream region in which the film has been formed, regions other than the region in which the film is to be formed are coated with resin and the film is formed of particles that are coarse, compared with the downstream region. Similar processes are repeated: as the film-formation region is gradually shifted upstream, a film is formed of coarser particles so that particles having different sizes are distributed in the axial direction. By adjusting the immersion time for coating with resin, a certain amount of the resin is also distributed in a boundary portion with respect to the non-coating region by capillarity and hence graded permeation resistance can be achieved in the boundary portion. In the boundary portion, a film constituted by particles of two types of different particle size distributions is formed and the pore distribution can also be made to vary not stepwise but continuously. The sharpness index Ds indicates the sharpness of the particle size distribution of the pore-forming agent having a predetermined average particle size (for example, 4 μm). The sharpness index Ds is defined as being calculated with $Ds=D50/(D90-D10)$ where the median diameters D10, D50, and D90 of the pore-forming agent are measured by a laser diffraction/scattering particle size distribution analyzer. The pore-forming agent may be composed of a material that can be removed by a heat treatment. For example, this material may be one or more selected from the group consisting of carbon black, coke, starch, rice powder, natural resin, and synthetic resin.

The bonding layers 27 are used to bond the honeycomb segments 21 together and may contain inorganic particles, inorganic fibers, a binder, and the like. The inorganic particles may be particles of the above-described inorganic materials and preferably have an average particle size of 0.1 μm or more and 30 μm or less. For example, the inorganic fibers may be formed so as to contain one or more materials selected from aluminosilicate, alumina, silica, zirconia, ceria, and mullite. For example, the inorganic fibers preferably have an average particle size of 0.5 μm or more and 8 μm or less and an average length of 100 μm or more and 500 μm or less. The binder may be colloidal silica, clay, or the like. The bonding layers 27 are preferably formed so as to have a thickness of 0.5 mm or more and 2 mm or less. The circumferential protective portion 28 is used to protect the circumference of the honeycomb filter 20 and may contain the above-described inorganic particles, inorganic fibers, binder, and the like.

In the honeycomb filter 20, the thermal expansion coefficient of the cells 23 in the channel direction at 40° C. to 800° C. is preferably $6.0 \times 10^{-6}/°$ C. or less, more preferably $1.0 \times 10^{-6}/°$ C. or less, still more preferably $0.8 \times 10^{-6}/°$ C. or less. When the thermal expansion coefficient is $6.0 \times 10^{-6}/°$ C. or less, thermal stress generated upon exposure to a high-temperature exhaust gas can be suppressed within the allowable range.

The outer shape of the honeycomb filter 20 is not particularly limited and may be a cylindrical shape, a rectangular prism shape, an elliptic cylindrical shape, a hexagonal prism shape, or the like. The outer shape of the honeycomb segments 21 is not particularly limited and the honeycomb segments 21 preferably have planar surfaces suitable for bonding together. The honeycomb segments 21 may have a prism shape whose cross section has a polygonal shape (a rectangular prism shape, a hexagonal prism shape, or the like). The cross section of the cells may have a shape of a polygon such as a triangle, a quadrangle, a hexagon, or an octagon; a streamline shape such as a circular shape or an elliptic shape; or the shape of a combination of the foregoing. For example, the cells 23 may be formed so as to have a quadrangular cross section perpendicular to the direction in which exhaust gas flows.

In the honeycomb filter 20, the cell pitch is preferably 1.0 mm or more and 2.5 mm or less. The larger the filtration area is, the smaller the pressure loss upon the deposition of PM becomes. On the other hand, the smaller the cell diameter is, the larger the initial pressure loss becomes. Accordingly, the cell pitch, the cell density, and the thickness of the partition portions 22 are preferably determined in consideration of the tradeoff relationship relating to the initial pressure loss, the pressure loss upon the deposition of PM, and the trapping efficiency of PM.

The honeycomb filter 20 may be loaded with a catalyst. This catalyst may be at least one of catalysts for promoting combustion of trapped PM, catalysts for oxidizing unburned gas (HCs, CO, and the like) contained in exhaust gas, and catalysts for storing/absorbing/decomposing NOx. In this case, for example, PM can be efficiently removed; unburned gas can be efficiently oxidized; or NOx can be efficiently decomposed. For example, such a catalyst preferably contains one or more of noble metal elements and transition metal elements. The honeycomb filter 20 may be loaded with another catalyst or another cleaning agent: for example, a NOx storage catalyst containing an alkali metal (Li, Na, K, Cs, or the like) or an alkaline-earth metal (Ca, Ba, Sr, or the like), at least one rare-earth metal, a transition metal, a three-way catalyst, a promoter exemplified by cerium (Ce) oxide and/or zirconium (Zr) oxide, or a HC (hydrocarbon) adsorbent. Specifically, examples of the noble metal include platinum (Pt), palladium (Pd), rhodium (Rh), gold (Au), and silver (Ag). Examples of the transition metal contained in the catalyst include Mn, Fe, Co, Ni, Cu, Zn, Sc, Ti, V, and Cr. Examples of the rare-earth metal include Sm, Gd, Nd, Y, La, and Pr. Examples of the alkaline-earth metal include Mg, Ca, Sr, and Ba. Of these, platinum and palladium are preferred.

Such a noble metal, a transition metal, a promoter, or the like may be loaded in a carrier having a large specific surface. Examples of the carrier include alumina, silica, silica alumina, and zeolite. When a catalyst for promoting combustion of PM is loaded, PM trapped on the trapping layers 24 can be more readily removed. When a catalyst for oxidizing unburned gas or a catalyst for decomposing NOx is loaded, exhaust gas can be further cleaned.

In the honeycomb filter 20 according to the above-described embodiment, pore volumes, pore distribution, and the like in the upstream and downstream portions of the honeycomb filter 20 are made to satisfy suitable ranges to thereby enhance the performances of trapping solid components contained in fluid: for example, a decrease in PM combustion percentage after endurance of combustion removal of deposited PM by forced regeneration can be further suppressed, clogging of the pores of the trapping layers can be further suppressed, and the pressure loss upon deposition of PM can be further reduced.

It is apparent that the present invention is not limited to the above-described embodiment at all and various embodiments can be made within the technical scope of the present invention.

Figure 4:
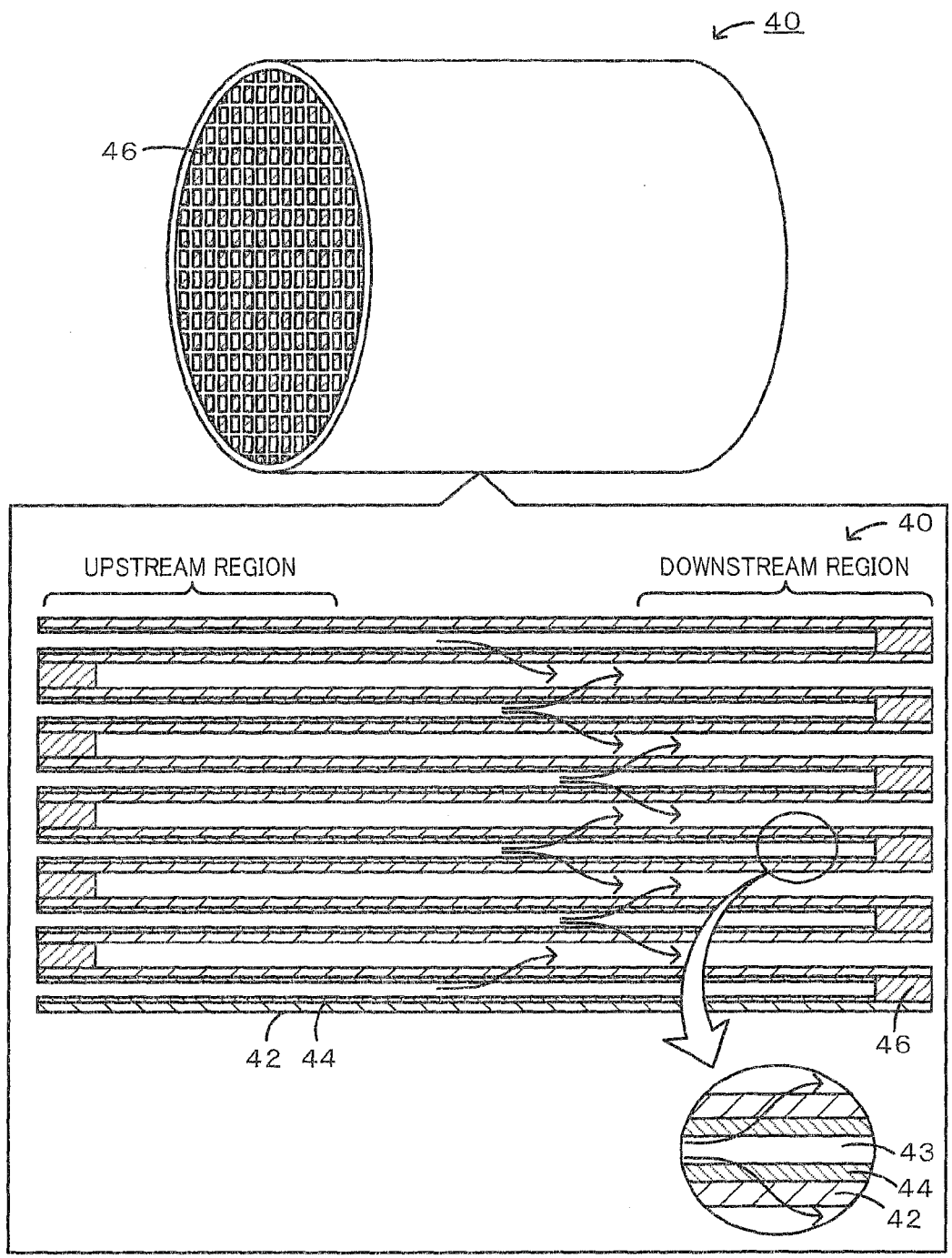
FIG. 4 is an explanatory view illustrating a schematic example of the configuration of an integrally formed honeycomb filter 40.

For example, in the above-described embodiment, the honeycomb segments 21 are bonded together with the bonding layers 27 to constitute the honeycomb filter 20. Alternatively, as illustrated in FIG. 4, an integrally formed honeycomb filter 40 may be employed. In the honeycomb filter 40, partition portions 42, cells 43, trapping layers 44, sealing portions 46, and the like may have configurations similar to those of the partition portions 22, the cells 23, the trapping layers 24, the sealing portions 26, and the like of the honeycomb filter 20. When the honeycomb filter 40 is employed, the performance of trapping and removing PM contained in exhaust gas can also be further enhanced.

In the above-described embodiment, the honeycomb filter 20 contains a catalyst. However, this is not particularly limitative as long as a substance that is contained in flowing fluid and intended to be removed can be cleaned. The honeycomb filter 20 may be provided without containing catalysts. The honeycomb filter 20 for trapping PM contained in exhaust gas has been described. However, this is not particularly limitative as long as a honeycombs filter for trapping and removing solid components contained in fluid is employed. A honeycomb filter for a power engine of construction machinery may be provided. Alternatively, a honeycomb filter for a plant or a power plant may be provided.

EXAMPLES

Hereinafter, examples in which honeycomb filters were specifically produced will be described as experimental examples. Herein, the produced honeycomb filters had a structure in which a plurality of honeycomb segments were bonded together.

Production of Honeycomb Filter

A SiC powder and a metal Si powder were mixed at a mass ratio of 80:20. Methylcellulose, hydroxypropoxylmethylcellulose, a surfactant, and water were added to the mixture and the resultant mixture was kneaded to prepare a plastic pug. This pug was extruded with a predetermined die to form honeycomb segment formed bodies having a desired shape. Herein, the formed shape was as follows: the thickness of the partition portions was 305 μm; the cell pitch was 1.47 mm; the cross section was 35 mm×35 mm; and the length was 152 ran. The obtained honeycomb segment formed bodies were then dried with microwaves, further dried with hot air, subsequently sealed, calcined in an oxidizing atmosphere at 550° C. for 3 hours, and subsequently fired in an inert atmosphere at 1400° C. for 2 hours. The sealing portions were formed by alternately masking cell openings in an end surface of each segment formed body and immersing the masked end surface into a sealing slurry containing a SiC raw material so that openings and sealing portions were alternately arranged. Similarly, a mask was formed on the other end surface and the sealing portions were formed such that a cell having one end open and the other end sealed and a cell having one end sealed and the other end open were alternately arranged. The air containing SiC particles having an average particle size smaller than the average pore diameter of the partitions was made to flow from the opening end portions on the exhaust-gas entry side of the resultant honeycomb segment fired body while the air was suctioned from the exit side of the honeycomb segment to thereby deposit the SiC particles on the surfaces of the partitions on the exhaust-gas entry side. At this time, a pore distribution adjustment treatment described below for trapping layers was performed so that trapping layers in which pore distributions were adjusted in the upstream and downstream regions of the honeycomb filter were formed on the partition portions. A heat treatment was subsequently performed in the air atmosphere at 1300° C. for 2 hours so that the SiC particles deposited on the surfaces of the partitions were bonded together and the deposited SiC particles and SiC and Si particles forming the partitions were bonded together. Thus, honeycomb segments in which the trapping layers were formed on the partition portions were prepared. Side surfaces of the thus-prepared honeycomb segments were coated with a bonding slurry prepared by kneading alumina silicate fibers, colloidal silica, polyvinyl alcohol, SiC, and water. These honeycomb segments were combined together, bonded under pressure, and then dried by heating. Thus, a honeycomb segment assembly whose whole shape is a rectangular prism shape was obtained. The honeycomb segment assembly was ground so as to have a cylindrical shape. The circumference of the assembly was then covered with a circumference coating slurry composed of the same material as that of the bonding slurry. The slurry was cured by being dried to thereby provide a cylindrical honeycomb filter having a desired shape, a desired segment shape, and a desired cell structure. Herein, the honeycomb filter had a shape in which the diameter of a cross section was 144 mm, the length was 152 mm, the thickness of the partition portions was 300 µm, and the cell pitch was 1.47 mm. The porosity and the pore diameter of the partition portions were measured with a mercury porosimeter (manufactured by Micromeritics Instrument Corporation, Auto Pore III type 9405). The average particle size of the raw-material particles of the trapping layers was the median diameter (D50) measured with a laser diffraction/scattering particle size distribution analyzer (LA-910 manufactured by HORIBA, Ltd.) and with water serving as a dispersion medium.

Pore Distribution Adjustment Treatment

The SiC particles forming the particle group of the trapping layers were supplied together with the air and a pore-forming agent to each honeycomb segment to thereby deposit the SiC particles on the partition portions. At this time, by properly determining conditions including the particle size and particle size distribution of the pore-forming agent, the amount of the pore-forming agent added, and the feed rate of the air, the pore distribution can be controlled. Herein, starch was used as the pore-forming agent. By making predetermined regions of the partition portions such as the upstream and downstream regions of the honeycomb segment contain alcohol, water, a resin, or the like to increase the permeation resistance to the air, regions where the raw-material particles of the trapping layers and the pore-forming agent supplied are deposited can be controlled. For example, by making the amount of the pore-forming agent added to the raw-material particles of the trapping layers be 3 mass % to 45 mass %, by making the median particle diameter D50 of the pore-forming agent be 0.7 µm to 8.0 µm, by making the sharpness index Ds of the particle size distribution of the pore-forming agent be 0.4 to 1.9, and by making the flow rate of the fluid be 780 L/min to 820 L/min, values including a pore volume and a peak pore diameter were varied in the upstream and downstream portions. In the film formation of the downstream region, regions other than the downstream region were covered with resin. After the film formation in the downstream region, the resin was removed by burning and the downstream region was subsequently covered with resin and a film was formed in the regions other than the downstream region. In this way, the porosity and pore diameter were controlled for regions of the trapping layers.

Catalyst Loading

A slurry of a catalyst containing water as a medium was first prepared by mixing a raw material in which alumina:platinum:ceria-based material=7:0.5:2.5 by weight was satisfied and the ceria-based material satisfied Ce:Zr:Pr:Y:Mn=60:20:10:5:5 by weight. The exit end surface (from which exhaust gas flows out) of the honeycomb segment was then immersed to a predetermined height in the slurry while suction from the entry end surface (into which exhaust gas flows) was performed so as to be adjusted to a predetermined suction pressure and a predetermined suction rate for a predetermined time. Thus, the partitions were loaded with the catalyst. The honeycomb segment was dried at 120° C. for 2 hours and then baked at 550° C. for an hour. The amount of the catalyst per unit volume of the honeycomb filter was made to be 45 g/L.

Pore Distribution Measurement by Mercury Porosimetry

The pore distribution of the produced honeycomb filter was measured with a mercury porosimetry (manufactured by Micromeritics Instrument Corporation, Auto Pore III type 9405). As illustrated in FIG. 2, measurement specimens were prepared in the following manner. The honeycomb filter was first cut so as to provide a cross section, at a portion that was away from the upstream end surface of the honeycomb filter by 20% of the entire length of the honeycomb filter. Three measurement specimens having sides of about 1 cm were cut from the central portion of the cross section (upstream specimens). Similarly, the honeycomb filter was cut so as to provide a cross section, at a portion that was away from the upstream end surface of the honeycomb filter by 50% of the entire length of the honeycomb filter. A measurement specimen having sides of about 1 cm was cut from the central portion of the cross section (midstream specimen). The honeycomb filter was cut so as to provide a cross section, at a portion that was away from the downstream end surface of the honeycomb filter by 20% of the entire length of the honeycomb filter. Three measurement specimens having sides of about 1 cm were cut from the central portion of the cross section (downstream specimens). These specimens were measured by mercury porosimetry in accordance with JIS-R1655.

Experimental Examples 1 to 7

A honeycomb filter was defined as Experimental example 1 in which the second pore volume peak position was at 14 µm and the porosity was 40% in the upstream and midstream portions of the honeycomb filter, the second pore volume peak was at 14 µm and the porosity was 40% in the downstream portion of the honeycomb filter, and the pore volume difference obtained by subtracting the volume of pores having a diameter of 10 µm or less in the upstream portion from the volume of pores having a diameter of 10 µm or less in the downstream portion (hereafter, simply referred to as pore volume difference) was 0 cm$^3$/g. A honeycomb filter produced as in Experimental example 1 except that the pore volume difference was made 0.01 cm$^3$/g was defined as Experimental example 2. A honeycomb filter produced as in Experimental example 1 except that the pore volume difference was made 0.03 cm$^3$/g was defined as Experimental example 3. A honeycomb filter produced as in Experimental example 1 except that the pore volume difference was made 0.05 cm$^3$/g was defined as Experimental example 4. A honeycomb filter produced as in Experimental example 1 except that the pore volume difference was made 0.07 cm$^3$/g was defined as Experimental example 5. A honeycomb filter produced as in Experimental example 1 except that the pore volume difference was made 0.08 cm$^3$/g was defined as Experimental example 6. A honeycomb filter produced as in Experimental example 1 except that the pore volume difference was made 0.09 cm$^3$/g was defined as Experimental example 7.

Thus, in Experimental examples 1 to 7, clear first pore volume peaks were not present in the downstream portion and the pore volume difference between the downstream portion and the upstream portion was adjusted. The pore distribution adjustment treatment performed will be described. By classifying the pore-forming agent and by adjusting the amount of the pore-forming agent added that had a particular particle size distribution, the volume of pores having a diameter of 10 µm or less only was controlled. The pore-forming agent was classified by a dry process such that the median particle diameter D10 became 1.5 µm, D50 became 4 µm, and D90 became 6.5 µm. In addition, the film-formation flow rate was made large so that the influence of pores constituted by gaps between raw-material particles was suppressed; a two-peak pore distribution was not formed and the influence of the volume of pores having a diameter of 10 µm or less only was evaluated. With respect to each condition, regions other than the downstream region were coated with resin and a film was formed only in the downstream region. At this time, the pore-forming agent was added in the amounts described in Table 1 to thereby control the volume of pores having a diameter of 10 µm or less. After that, the resin was removed by burning and only the downstream portion (downstream region) in which the film had been formed was then coated with resin. In the remaining upstream portion (upstream region), a film was formed in a film-formation amount of 15 g/L and at a flow rate of 820 L/min without adding the pore-forming agent.

TABLE 1

| No | Film formation conditions | | Pore forming agent | | 10 µm or less |
| | Film formation amount (g/L) | Flow rate (L/min) | D50 (µm) | Added amount (mass %) | Pore volume difference (cm3/g) |
|---|---|---|---|---|---|
| Examples 1 | 15 | 820 | 4.0 | 3 | 0 |
| Examples 2 | 15 | 820 | 4.0 | 4 | 0.01 |
| Examples 3 | 15 | 820 | 4.0 | 6 | 0.03 |
| Examples 4 | 15 | 820 | 4.0 | 10 | 0.05 |
| Examples 5 | 15 | 820 | 4.0 | 12 | 0.07 |
| Examples 6 | 15 | 820 | 4.0 | 14 | 0.08 |
| Examples 7 | 15 | 820 | 4.0 | 15 | 0.09 |

Experimental Examples 8 to 14

A honeycomb filter was defined as Experimental example 8 in which, in the upstream and midstream portions of the honeycomb filter, the second pore volume peak position was at 14 µm and the porosity was 40%; in the downstream portion of the honeycomb filter, the first pore volume peak position was at 1 µm, the second pore volume peak position was at 14 µm, and the porosity was 40%; and the pore volume difference was 0.04 cm$^3$/g. A honeycomb filter produced as in Experimental example 8 except that the first pore volume peak position in the downstream portion was made at 2 µm was defined as Experimental example 9. A honeycomb filter produced as in Experimental example 8 except that the first pore volume peak position in the downstream portion was made at 3 µm was defined as Experimental example 10. A honeycomb filter produced as in Experimental example 8 except that the first pore volume peak position in the downstream portion was made at 5 µm was defined as Experimental example 11. A honeycomb filter produced as in Experimental example 8 except that the first pore volume peak position in the downstream portion was made at 7 µm was defined as Experimental example 12. A honeycomb filter produced as in Experimental example 8 except that the first pore volume peak position in the downstream portion was made at 9 µm was defined as Experimental example 13. A honeycomb filter produced as in Experimental example 8 except that the first pore volume peak position in the downstream portion was made at 10 µm was defined as Experimental example 14.

As described above, in Experimental examples 8 to 14, the first pore volume peak position in the downstream portion was adjusted. The pore distribution adjustment treatment performed will be described. The peak pore diameter of the first pore diameter was adjusted by changing the particle size of the pore-forming agent added to the film-formation raw material. The particle size distribution of the pore-forming agent was adjusted such that the sharpness index Ds=D50/(D90−D10) became 1.8. Regions other then the downstream region were first coated with resin and a film was formed only in the downstream region including the downstream portion under conditions described in Table 2. After that, only the downstream portion (downstream region) in which the film, bad been formed was coated with resin. In the remaining upstream portion (upstream region), a film was formed in a film-formation amount of 15 g/L and at a flow rate of 820 L/min without adding the pore-forming agent.

TABLE 2

| No | Film formation conditions | | Pore forming agent | | |
|---|---|---|---|---|---|
| | Film formation amount (g/L) | Flow rate (L/min) | D50 (μm) | Added amount (mass %) | First pore volume peak (μm) |
| Examples 8 | 15 | 780 | 0.7 | 15 | 1 |
| Examples 9 | 15 | 780 | 1.7 | 15 | 2 |
| Examples 10 | 15 | 780 | 2.5 | 15 | 3 |
| Examples 11 | 15 | 780 | 4.1 | 15 | 5 |
| Examples 12 | 15 | 780 | 5.6 | 15 | 7 |
| Examples 13 | 15 | 780 | 7.1 | 15 | 9 |
| Examples 14 | 15 | 780 | 8.0 | 15 | 10 |

Experimental Examples 15 to 22

A honeycomb filter was defined as Experimental example 15 in which, in the upstream and midstream portions of the honeycomb filter, the second pore volume peak position was at 9 μm and the porosity was 40%; in the downstream portion of the honeycomb filter, the first pore volume peak position was at 4 μm, the second pore volume peak position was at 9 μm, and the porosity was 40%; and the pore volume difference was 0.04 cm$^3$/g. A honeycomb filter produced as in Experimental example 15 except that the second pore volume peak position in the upstream, midstream, and downstream portions was made at 10 μm was defined as Experimental example 16. A honeycomb filter produced as in Experimental example 15 except that the second pore volume peak position in the upstream, midstream, and downstream portions was made at 12 μm was defined as Experimental example 17. A honeycomb filter produced as in Experimental example 15 except that the second pore volume peak position in the upstream, midstream, and downstream portions was made at 15 μm was defined as Experimental example 18. A honeycomb filter produced as in Experimental example 15 except that the second pore volume peak position in the upstream, midstream, and downstream portions was made at 20 μm was defined as Experimental example 19. A honeycomb filter produced as in Experimental example 15 except that the second pore volume peak position in the upstream, midstream, and downstream portions was made at 22 μm was defined as Experimental example 20. A honeycomb filter produced as in Experimental example 15 except that the second pore volume peak position in the upstream, midstream, and downstream portions was made at 25 μm was defined as Experimental example 21. A honeycomb filter produced as in Experimental example 15 except that the second pore volume peak position in the upstream, midstream, and downstream portions was made at 27 μm was defined as Experimental example 22.

As described above, in Experimental examples 15 to 22, the second pore volume peak position in the upstream, midstream, and downstream portions was adjusted. In the pore distribution adjustment treatment performed, the pore characteristics of the partition portions were controlled by adjusting the particle size distribution of the raw material and the pore-forming agent. A film was formed under conditions in which the film-formation amount was 15 g/L, a flow rate was 780 L/min, D50 of the pore-forming agent was 3.8 μm, and the amount of the pore-forming agent added was 20 mass %.

Experimental Examples 23 to 33

A honeycomb filter was defined as Experimental example 23 in which, in the upstream, midstream, and downstream portions of the honeycomb filter, the second pore volume peak position was at 14 μm and the porosity was 33%; in the downstream portion, the first pore volume peak position was at 4 μm; and the pore volume difference was 0.04 cm$^3$/g. A honeycomb filter produced as in Experimental example 23 except that the porosity in the upstream, midstream, and downstream portions was made 35% was defined as Experimental example 24. A honeycomb filter produced as in Experimental example 23 except that the porosity in the upstream, midstream, and downstream portions was made 40% was defined as Experimental example 25. A honeycomb filter produced as in Experimental example 23 except that the porosity in the upstream, midstream, and downstream portions was made 45% was defined as Experimental example 26. A honeycomb filter produced as in Experimental example 23 except that the porosity in the upstream, midstream, and downstream portions was made 50% was defined as Experimental example 27. A honeycomb filter produced as in Experimental example 23 except that the porosity in the upstream, midstream, and downstream portions was made 55% was defined as Experimental example 28. A honeycomb filter produced as in Experimental example 23 except that the porosity in the upstream, midstream, and downstream portions was made 60% was defined as Experimental example 29. A honeycomb filter produced as in Experimental example 23 except that the porosity in the upstream, midstream, and downstream portions was made 65% was defined as Experimental example 30. A honeycomb filter produced as in Experimental example 23 except that the porosity in the upstream, midstream, and downstream portions was made 70% was defined as Experimental example 31. A honeycomb filter produced as in Experimental example 23 except that the porosity in the upstream, midstream, and downstream portions was made 73% was defined as Experimental example 32. A honeycomb filter produced as in Experimental example 23 except that the porosity in the upstream, midstream, and downstream portions was made 75% was defined as Experimental example 33.

As described above, in Experimental examples 23 to 33, the porosity in the upstream, midstream, and downstream portions was adjusted. The pore distribution adjustment treatment performed will be described. The porosity of the trapping layers was controlled by adjusting the amount of the pore-forming agent added and the sharpness index Ds of the particle size. Specific film-formation conditions are described in Table 3. Regions other than the downstream region were coated with resin and a film was formed only in the downstream region including the downstream portion under conditions described in Table 3. After that, only the downstream portion (downstream region) in which the film had been formed was coated with resin. In the remaining upstream portion (upstream region), a film was formed in a film-formation amount of 15 g/L and at a flow rate of 820 L/min without adding the pore-forming agent.

TABLE 3

| No | Film formation conditions | | Pore forming agent | | | |
|---|---|---|---|---|---|---|
| | Film formation amount (g/L) | Flow rate (L/min) | D50 (μm) | Added amount (mass %) | Sharpness index Ds1 | Porosity (%) |
| Examples 23 | 15 | 780 | 3.5 | 8 | 1.9 | 33 |
| Examples 24 | 15 | 780 | 3.5 | 10 | 1.9 | 35 |
| Examples 25 | 15 | 780 | 3.5 | 14 | 1.8 | 40 |

TABLE 3-continued

| No | Film formation conditions Film formation amount (g/L) | Film formation conditions Flow rate (L/min) | Pore forming agent D50 (μm) | Pore forming agent Added amount (mass %) | Pore forming agent Sharpness index Ds1) | Porosity (%) |
|---|---|---|---|---|---|---|
| Examples 26 | 15 | 780 | 3.5 | 19 | 1.7 | 45 |
| Examples 27 | 15 | 780 | 3.5 | 23 | 1.6 | 50 |
| Examples 28 | 15 | 780 | 3.5 | 27 | 1.5 | 55 |
| Examples 29 | 15 | 780 | 3.5 | 31 | 1.3 | 60 |
| Examples 30 | 15 | 780 | 3.5 | 35 | 1.1 | 65 |
| Examples 31 | 15 | 780 | 3.5 | 40 | 0.8 | 70 |
| Examples 32 | 15 | 780 | 3.5 | 43 | 0.6 | 73 |
| Examsles 33 | 15 | 780 | 3.5 | 45 | 0.4 | 75 |

1)Sharpness index Ds = D50/(D90 − D10)

Pressure Loss Test

Each of the honeycomb filters produced above was installed in a position directly below a 2.0-L diesel engine. The engine was maintained at 2500 rpm and 40 Nm and the pressure loss of the honeycomb filter during deposition of PM was measured. After a predetermined period, the honeycomb filter was removed from the engine and the weight of the honeycomb filter was measured. This weight was compared with the weight of the honeycomb filter before the test to thereby calculate the amount of PM deposition. The pressure loss at the time of deposition of 4 g/L was defined as the pressure loss of the measured honeycomb filter.

Cleaning Performance after Aging

Each of the honeycomb filters was aged in an electric furnace in the air atmosphere at a constant temperature of 850° C. for 8 hours to thereby simulate endurance conditions in an actual car. After that, PM was deposited in 8 g/L in the same manner as in the pressure loss test. Forced regeneration was then performed by post injection under constant conditions of 2500 rpm and 40 Nm to increase the gas temperature at the entry of the honeycomb filter to 650° C. and this state was maintained for 10 minutes. After the test, the weight of the honeycomb filter was measured. The regeneration efficiency was calculated from the amount of PM burnt with respect to 8 g/L. The resultant value was defined as the cleaning performance after aging.

Trapping Efficiency

The smoke numbers were measured upstream and downstream of the honeycomb filter in the measurement of the pressure loss test. The ratio of trapping smoke due to passing through the honeycomb filter with respect to the smoke number at the entrance of the honeycomb filter was defined as the measured trapping efficiency. A device for measuring the smoke numbers was a smoke meter AVL 415S manufactured by AVL.

Experimental Results

Figure 5:
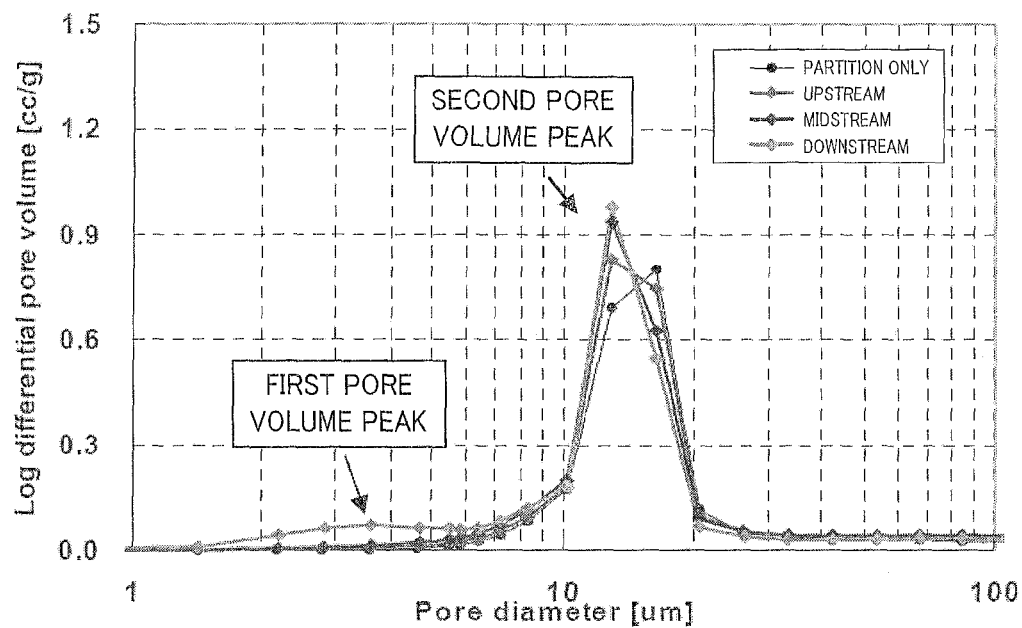
FIG. 5 illustrates the measurement results of Log differential pore volume distributions in Experimental example 10.
Figure 6:
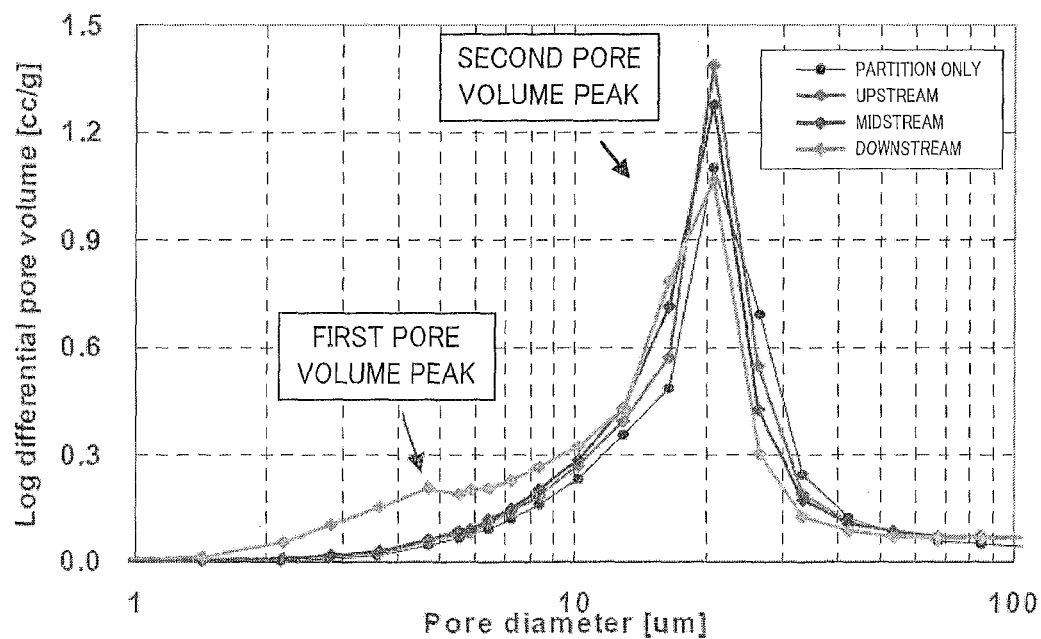
FIG. 6 illustrates the measurement results of Log differential pore volume distributions in Experimental example 29.
Figure 7:
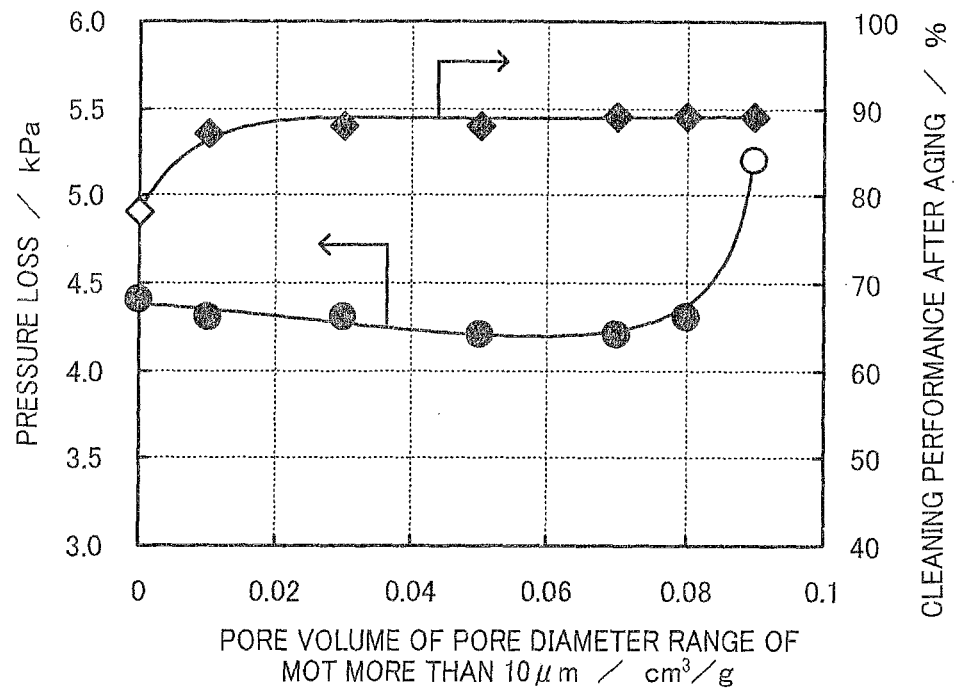
FIG. 7 is a graph in terms of pressure loss, cleaning performance, and pore volume in Experimental examples 1 to 7.
Figure 8:
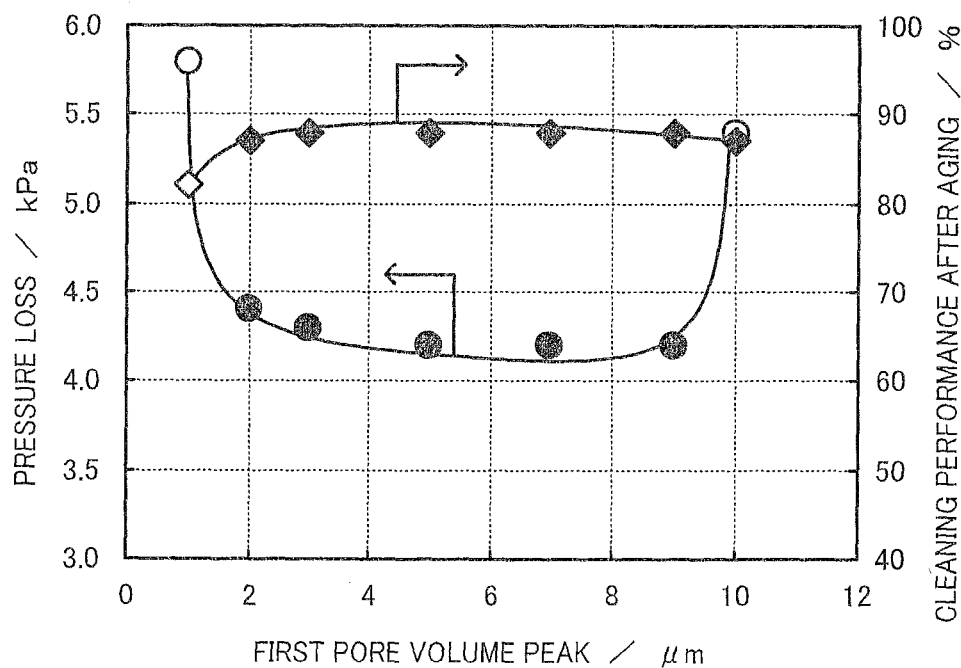
FIG. 8 is a graph in terms of pressure loss, cleaning performance, and the first pore volume peak in Experimental examples 8 to 14.
Figure 9:
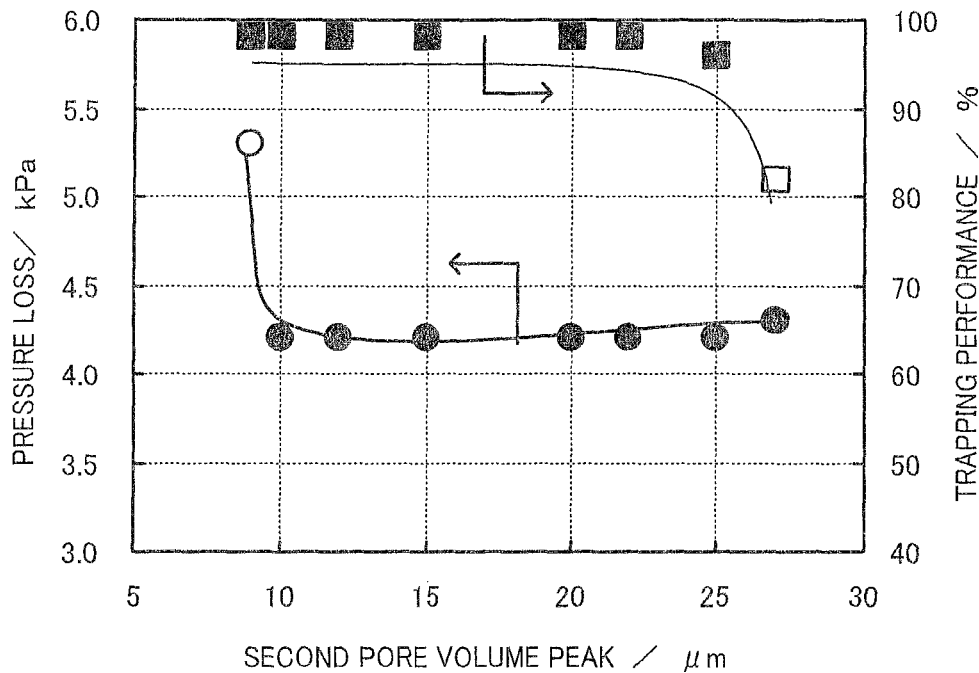
FIG. 9 is a graph in terms of pressure loss, trapping performance, and the second pore volume peak in Experimental examples 15 to 22.
Figure 10:
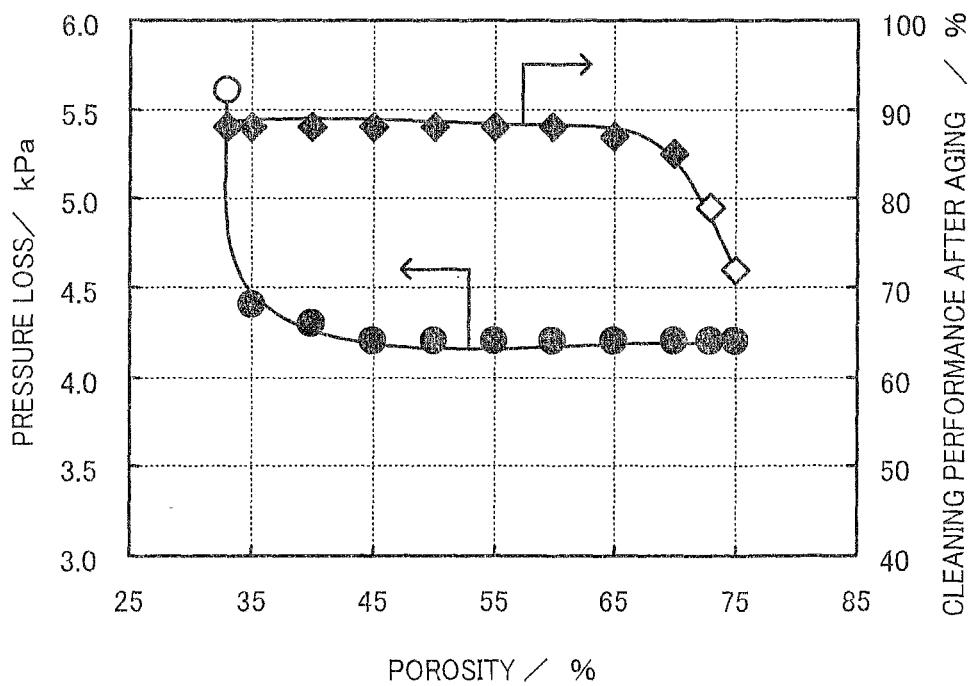
FIG. 10 is a graph in terms of pressure loss, cleaning performance, and porosity in Experimental examples 23 to 33.

The measurement results and the like of Experimental examples 1 to 33 are described in Table 4. FIG. 5 illustrates the measurement results of Log differential pore volume distributions in Experimental example 10. FIG. 6 illustrates the measurement results of Log differential pore volume distributions in Experimental example 29. FIG. 7 is a graph in terms of pressure loss, cleaning performance, and pore volume in Experimental examples 1 to 7. FIG. 8 is a graph in terms of pressure loss, cleaning performance, and the first pore volume peak in Experimental examples 8 to 14. FIG. 9 is a graph in terms of pressure loss, trapping performance, and the second pore volume peak in Experimental examples 15 to 22. FIG. 10 is a graph in terms of pressure loss, cleaning performance, and porosity in Experimental examples 23 to 33. As illustrated in FIGS. 5 and 6, in the downstream portion of the honeycomb filter, a first pore volume peak was present in a first pore diameter range of 2 μm or more and 9 μm or less and a second pore volume peak that was higher than the first pore volume peak was present in a second pore diameter range of 10 μm or more and 25 μm or less; on the other hand, in the upstream portion of the honeycomb filter, only the second pore volume peak in the second pore diameter range of 10 μm or more and 25 μm or less was present. Since the pore volume in the downstream portion of the honeycomb filter was large, a larger amount of the trapping layers were probably formed in the downstream portion.

TABLE 4

| No | Upstream portion Pore volume peak [μm] | Upstream portion Porosity [%] | Midstream portion Pore volume peak [μm] | Midstream portion Porosity [%] | Downstream portion First pore volume peak [μm] | Downstream portion Second pore volume peak [μm] | Downstream portion Porosity [%] | Pore volume of 10 μm or less (downstream-upstream) [cm³/g] | Cleaning performance after aging [%] | Pressure loss [kPa] | Trapping efficiency [%] |
|---|---|---|---|---|---|---|---|---|---|---|---|
| Examples 1 | 14 | 40 | 14 | 40 | — | 14 | 40 | 0 | 78 | 4.4 | 98 |
| Examples 2 | 14 | 40 | 14 | 40 | — | 14 | 40 | 0.01 | 87 | 4.3 | 98 |
| Examples 3 | 14 | 40 | 14 | 40 | — | 14 | 40 | 0.03 | 88 | 4.3 | 98 |
| Examples 4 | 14 | 40 | 14 | 40 | — | 14 | 40 | 0.05 | 88 | 4.2 | 98 |
| Examples 5 | 14 | 40 | 14 | 40 | — | 14 | 40 | 0.07 | 89 | 4.2 | 98 |
| Examples 6 | 14 | 40 | 14 | 40 | — | 14 | 40 | 0.08 | 89 | 4.3 | 98 |
| Examples 7 | 14 | 40 | 14 | 40 | — | 14 | 40 | 0.09 | 89 | 5.2 | 97 |
| Examples 8 | 14 | 40 | 14 | 40 | 1 | 14 | 40 | 0.04 | 82 | 5.8 | 98 |
| Examples 9 | 14 | 40 | 14 | 40 | 2 | 14 | 40 | 0.04 | 87 | 4.4 | 98 |
| Examples 10 | 14 | 40 | 14 | 40 | 3 | 14 | 40 | 0.04 | 88 | 4.3 | 98 |
| Examples 11 | 14 | 40 | 14 | 40 | 5 | 14 | 40 | 0.04 | 88 | 4.2 | 98 |
| Examples 12 | 14 | 40 | 14 | 40 | 7 | 14 | 40 | 0.04 | 88 | 4.2 | 98 |
| Examples 13 | 14 | 40 | 14 | 40 | 9 | 14 | 40 | 0.04 | 88 | 4.2 | 98 |
| Examples 14 | 14 | 40 | 14 | 40 | 10 | 14 | 40 | 0.04 | 87 | 5.4 | 97 |
| Examples 15 | 9 | 40 | 9 | 40 | 4 | 9 | 40 | 0.04 | 88 | 5.3 | 98 |
| Examples 16 | 10 | 40 | 10 | 40 | 4 | 10 | 40 | 0.04 | 88 | 4.2 | 98 |
| Examples 17 | 12 | 40 | 12 | 40 | 4 | 12 | 40 | 0.04 | 88 | 4.2 | 98 |
| Examples 18 | 15 | 40 | 15 | 40 | 4 | 15 | 40 | 0.04 | 88 | 4.2 | 98 |
| Examples 19 | 20 | 40 | 20 | 40 | 4 | 20 | 40 | 0.04 | 88 | 4.2 | 98 |
| Examples 20 | 22 | 40 | 22 | 40 | 4 | 22 | 40 | 0.04 | 88 | 4.2 | 98 |

TABLE 4-continued

| | Upstream portion | | Midstream portion | | Downstream portion | | | | | | |
|---|---|---|---|---|---|---|---|---|---|---|---|
| | | | | | First pore volume peak [μm] | Second pore volume peak [μm] | Porosity [%] | Pore volume of 10 μm or less (downstream-upstream) [cm³/g] | Cleaning performance after aging [%] | Pressure loss [kPa] | Trapping efficiency [%] |
| No | Pore volume peak [μm] | Porosity [%] | Pore volume peak [μm] | Porosity [%] | | | | | | | |
| Examples 21 | 25 | 40 | 25 | 40 | 4 | 25 | 40 | 0.04 | 88 | 4.2 | 96 |
| Examples 22 | 27 | 40 | 27 | 40 | 4 | 27 | 40 | 0.04 | 88 | 4.3 | 82 |
| Examples 23 | 14 | 33 | 14 | 33 | 4 | 14 | 33 | 0.04 | 88 | 5.6 | 98 |
| Examples 24 | 14 | 35 | 14 | 35 | 4 | 14 | 35 | 0.04 | 88 | 4.4 | 98 |
| Examples 25 | 14 | 40 | 14 | 40 | 4 | 14 | 40 | 0.04 | 88 | 4.3 | 98 |
| Examples 26 | 14 | 45 | 14 | 45 | 4 | 14 | 45 | 0.04 | 88 | 4.2 | 98 |
| Examples 27 | 14 | 50 | 14 | 50 | 4 | 14 | 50 | 0.04 | 88 | 4.2 | 98 |
| Examples 28 | 14 | 55 | 14 | 55 | 4 | 14 | 55 | 0.04 | 88 | 4.2 | 98 |
| Examples 29 | 14 | 60 | 14 | 60 | 4 | 14 | 60 | 0.04 | 88 | 4.2 | 98 |
| Examples 30 | 14 | 65 | 14 | 65 | 4 | 14 | 65 | 0.04 | 87 | 4.2 | 98 |
| Examples 31 | 14 | 70 | 14 | 70 | 4 | 14 | 70 | 0.04 | 85 | 4.2 | 98 |
| Examples 32 | 14 | 73 | 14 | 73 | 4 | 14 | 73 | 0.04 | 79 | 4.2 | 98 |
| Examples 33 | 14 | 75 | 14 | 75 | 4 | 14 | 75 | 0.04 | 72 | 4.2 | 98 |

Table 4 and FIGS. 7 to 10 indicate that, when the pore volume difference in volume of pores having a diameter of 10 μm or less between the downstream portion and the upstream portion of a honeycomb filter was less than 0.01 cm³/g, the cleaning performance after aging (PM combustion percentage after heating) became poor. This is probably because the amount of the catalyst loaded in the downstream portion of the trapping layers was insufficient. On the other hand, when the pore volume difference was more than 0.08 cm³/g, the pressure loss at the time of PM deposition became high. This is probably because an excessively large amount of the catalyst was deposited in the pores of the trapping layers in the downstream region and the catalyst clogged the pores of the trapping layers. When the first pore volume peak was present in a range of less than 2 μm, the pressure loss became high. This is probably because the permeability of the partition portions decreased. When the first pore volume peak was present in a range of more than 9 μm, the pressure loss became high. This is probably because PM was not sufficiently trapped and PM deposited in pores of the partition portions and hence the pressure loss was increased. When the second pore volume peak was present in a range of less than 10 μm, the pressure loss became high. This is probably because the catalyst clogged the pores of the partition portions and, as a result, a rapid increase in the pressure loss was caused. When the second pore volume peak was present in a range of more than 25 μm, the trapping performance was degraded. This is probably because the permeability of the partition portions became excessively high. When the partition portions had a porosity of 35% or more, the pressure loss decreased. This is probably because the permeability of the pores of the partition portions became low after coating with the catalyst. On the other hand, when the partition portions had a porosity of more than 70%, the cleaning performance after aging was degraded. This is probably because the pore volume of the partition portions was excessively high and hence most of the catalyst was deposited in the partition portions and the trapping layers were not sufficiently loaded with the catalyst.

Accordingly, it has been demonstrated that, when the pore volume difference in volume of pores having a diameter of 10 μm or less between the downstream portion and the upstream portion of a honeycomb filter calculated from pore distributions measured by mercury porosimetry is 0.01 cm³/g or more and 0.08 cm³/g or less, performances of trapping PM contained in exhaust gas such as pressure loss and the cleaning performance after aging can be enhanced. It has also been demonstrated that, in a preferred honeycomb filter, in a downstream portion, a first pore volume peak is present in a first pore diameter range of 2 μm or more and 9 μm or less and a second pore volume peak that is higher than the first pore volume peak is present in a second pore diameter range of 10 μm or more and 25 μm or less; and, in an upstream portion, only the second pore volume peak in the second pore diameter range of 10 μm or more and 25 μm or less is present. It has also been demonstrated that the porosity of the partition portions is preferably in a range of 35% or more and 70% or less.

The present application claims priority from Japanese Patent Application No. 2011-064165 filed on Mar. 23, 2011, the entire contents of which are incorporated herein by reference.

What is claimed is:

1. A honeycomb filter comprising:
   a plurality of porous partition portions forming a plurality of cells serving as channels of fluid; and
   trapping layers that are formed on the partition portions and configured to trap a solid component contained in the fluid,
   wherein a volume of pores having a diameter of 10 μm or less in a downstream portion of the cells measured by mercury porosimetry is larger than a volume of pores having a diameter of 10 μm or less in an upstream portion of the cells measured by mercury porosimetry by 0.01 cm³/g or more and 0.08 cm³/g or less.

2. The honeycomb filter according to claim 1, wherein, in a Log differential pore volume distribution of the downstream portion measured by mercury porosimetry, a first pore volume peak is present in a first pore diameter range and a second pore volume peak that is higher than the first pore volume peak is present in a second pore diameter range that includes a second pore diameter that is larger than a pore diameter of the first pore volume peak, and
   in a Log differential pore volume distribution of the upstream portion measured by mercury porosimetry, the second pore volume peak in the second pore diameter range only is present.

3. The honeycomb filter according to claim 2, wherein the first pore diameter range is a range of 2 μm or more and 9 μm or less, and
   the second pore diameter range is a range of 10 μm or more and 25 μm or less.

4. The honeycomb filter according to claim 1, wherein a porosity of the upstream portion and a porosity of the downstream portion that are measured by mercury porosimetry are in a range of 35% or more and 70% or less.

5. The honeycomb filter according to claim 1, wherein the trapping layers are formed by supplying an inorganic material serving as a raw material of the trapping layers to the cells with a gas serving as a transport medium.

6. The honeycomb filter according to claim 1, wherein the partition portions are formed so as to contain one or more inorganic materials selected from cordierite, SiC, mullite, aluminum titanate, alumina, silicon nitride, SIALON, zirconium phosphate, zirconia, titania, and silica.

7. The honeycomb filter according to claim 1, wherein the honeycomb filter includes two or more honeycomb segments bonded together with a bonding layer, the honeycomb segments including the partition portions and the trapping layers.

8. The honeycomb filter according to claim 1, wherein the honeycomb filter is loaded with a catalyst.

* * * * *